(12) United States Patent
Weng et al.

(10) Patent No.: US 9,201,923 B2
(45) Date of Patent: Dec. 1, 2015

(54) METHOD AND APPARATUS FOR ORGANIZING AND OPTIMIZING CONTENT IN DIALOG SYSTEMS

(75) Inventors: Fuliang Weng, Palo Alto, CA (US); Heather Pon-Barry, Palo Alto, CA (US)

(73) Assignee: ROBERT BOSCH CORPORATION, Broadview, IL (US)

( * ) Notice: Subject to any disclaimer, the term of this patent is extended or adjusted under 35 U.S.C. 154(b) by 300 days.

(21) Appl. No.: 11/243,599

(22) Filed: Oct. 4, 2005

(65) Prior Publication Data

US 2007/0078815 A1   Apr. 5, 2007

(51) Int. Cl.
G06F 17/30   (2006.01)

(52) U.S. Cl.
CPC ...... *G06F 17/30401* (2013.01); *G06F 17/3064* (2013.01); *G06F 17/30646* (2013.01); *G06F 17/30654* (2013.01); *G06F 17/30672* (2013.01); *G06F 17/30976* (2013.01); *G06F 17/30979* (2013.01)

(58) Field of Classification Search
CPC .............. G06F 17/30401; G06F 17/30654; G06F 17/30976; G06F 17/30979; G06F 17/30646; G06F 17/3064; G06F 17/30672
USPC ............................................................ 707/2
See application file for complete search history.

(56) References Cited

U.S. PATENT DOCUMENTS

| | | | | |
|---|---|---|---|---|
| 5,845,278 A | * | 12/1998 | Kirsch et al. | 707/3 |
| 6,044,347 A | * | 3/2000 | Abella et al. | 704/272 |
| 6,374,247 B1 | * | 4/2002 | Gebauer | 707/10 |
| 6,625,595 B1 | * | 9/2003 | Anderson et al. | 707/3 |
| 6,845,486 B2 | * | 1/2005 | Yamada et al. | 715/706 |
| 2004/0030689 A1 | * | 2/2004 | Anderson et al. | 707/3 |
| 2005/0278180 A1 | * | 12/2005 | O'Neill et al. | 704/275 |
| 2005/0288976 A1 | * | 12/2005 | Abrams et al. | 705/6 |

FOREIGN PATENT DOCUMENTS

EP   0 895 396   2/1999

OTHER PUBLICATIONS

Chung, G., "Developing a Flexible Spoken Dialog System Using Simulation", Proceedings Association for Computational Linguistics (ACL), Jul. 2004, p. 63-70.

(Continued)

*Primary Examiner* — Rehana Perveen
*Assistant Examiner* — Huen Wong
(74) *Attorney, Agent, or Firm* — Dergosits & Noah LLP (57) ABSTRACT

Embodiments of a configurable content optimizer for use in dialog systems are described. In one embodiment, the content optimizer is a configurable component that acts as an intermediary between a dialog management module and a knowledge management module of a dialog system during the query process. The content optimizer module makes extensive use of the system ontology and organizes items returned by the knowledge base and makes adjustments to the query so that a reasonable number of responses are returned. Each query is broken down into a number of constraints, the constraints are characterized by type, and adjustments are made by strategies that include relaxing or tightening constraints in the query. Generic strategies for the potential adjustments are represented in a configurable manner so that the content optimizing module can be easily applied to new domains.

9 Claims, 7 Drawing Sheets

(56) References Cited

OTHER PUBLICATIONS

Litman et al., "Evaluating Response Strategies in a Web-Based Spoken Dialogue Agent", Proceeding ACL-Coling, Aug. 1998, pp. 780-786.

Niels Ole Bernsen, "On-Line user Modeling in a Mobile Spoken Dialogue System", Proceedings Eurospeech, Sep. 2003, pp. 737-740.

Pon-Barry et al., "Evaluation of Content Presentation Strategies for an In-car Spoken Dialogue System", Proceedings Interspeech/International Conference on Spoken Language Processing, Sep. 17, 2006, pp. 1930-1933.

Coletti, P. et al., "A Speech Driven In-car Assistance System", Proc. IEEE Intelligent Vehicles Symposium, Jun. 9, 2003, pp. 622-626.

Weng F. et al, "A Conversational Dialogue System for Cognitively Overloaded Users", Proc. Interspeech-ICSLP, Oct. 4, 2004, pp. 233-236.

Botond, Pakucs, "Towards Dynamic Multi-Domain Dialogue Processing", Proc. Eurospeech, Sep. 2003, pp. 741-744.

\* cited by examiner

```
defaultFeatureOrder = [constraint1, constraint2, constraint3, constraint4]         302 restaurant.defaultFeatureOrder = [cuisine, location, price, creditcard]
```

```
relaxationStrategy.constraint1    = Strategy1
relaxationStrategy.constraint2    = Strategy2                                      304
relaxationStrategy.constraint3    = Strategy3
relaxationStrategy.constraint4    = Strategy4 restaurant.relaxationStrategy.cuisine      = OntologyStrategy
restaurant.relaxationStrategy.location     = ScalarStrategy
restaurant.relaxationStrategy.price        = ScalarStrategy
restaurant.relaxationStrategy.creditcard   = BinaryStrategy
```

```
threshold.ProcessEmptyResultSet    = [0, a]
threshold.DoNothing                = [b, c]                                        306
threshold.ProcessMediumResultSet   = [d, e]
threshold.ProcessLargeResultSet    = [f, INF]

restaurant.threshold.ProcessEmptyResultSet   = [0, 0]
restaurant.threshold.DoNothing               = [1, 3]
restaurant.threshold.ProcessMediumResultSet  = [4, 10]
restaurant.threshold.ProcessLargeResultSet   = [11, INF]
```

FIG. 3A

| RESULT SET SIZE | ACTION |
|---|---|
| $n = 0$ | ProcessEmptyResultSet |
| $0 < n <= 3$ | ListResultSet |
| $3 < n <= 10$ | ProcessMediumResultSet |
| $10 < n$ | ProcessLargeResultSet |

| 602 | 604 |
|---|---|
| (a) Dialogue before Content Optimization Module:<br>User: I'm looking for an inexpensive Japanese restaurant in Palo Alto.<br>System: I could not find any inexpensive Japanese restaurants in Palo Alto. | (b) Dialogue after Content Optimization Module:<br>User: I'm looking for an inexpensive Japanese restaurant in Palo Alto.<br>System: I could not find any inexpensive Japanese restaurants in Palo Alto.<br>System: However, there are 3 inexpensive Chinese restaurants and 1 inexpensive Vietnamese restaurant in Palo Alto.<br>User: What are the Chinese ones?<br>System: Hunan Garden, Jing Jing, and China Delight.<br>User: OK, how do I get to Hunan Garden? |

| 612 | 614 | 616 |
|---|---|---|
| CONSTRAINT NAME | CONSTRAINT TYPE | VALUES |
| NAME | String | --- |
| CREDITCARD | Binary | Yes, no |
| RESERVATIONS | Binary | Yes, no |
| VEGETARIAN_FRIENDLY | Binary | Yes, no |
| RATING | Scalar | 1 star, 2 star, 3 star, 4 star |
| PRICE | Scalar | Inexpensive, moderate, expensive |
| NOISE | Scalar | Quiet, medium, loud |
| DRESS | Scalar | Casual, standard, formal |
| CUISINE | Hierarchical | American, Californian, Chinese, Fast Food, French, Greek, Indian, Italian, Japanese, Korean, Mexican, Sandwich, Seafood, Spanish, Steak, Thai, Vietnamese |

FIG. 6C

METHOD AND APPARATUS FOR ORGANIZING AND OPTIMIZING CONTENT IN DIALOG SYSTEMS

FIELD

Embodiments of the invention relate generally to dialog systems, and specifically to optimizing and organizing content for human and machine dialog systems.

BACKGROUND

Dialog systems are systems in which a person speaks or otherwise enters input to a computer in natural language, in order to accomplish a result. With the rise of microprocessor-controlled appliances and equipment, dialog systems are becoming increasingly used to facilitate the man-machine interface in many applications such as computers, automobiles, industrial machinery, home appliances, automated telephone services, and so on. Dialog systems allow a user to enter a request or query in an expression or manner familiar to the user without requiring the user to learn a particular language or structure dictated by the computer. Dialog systems process the query and access one or more databases to retrieve responses to the query. In order to provide meaningful results with as little user interaction as possible, dialog systems should be designed and implemented to accommodate large variations in the content and format of the queries, as well as the content and format of the responsive data.

Current natural language dialog systems are typically data driven systems in which a query is processed and possible responses are retrieved from a database. The data driven system returns responses based on a distribution model that quantifies how close a response is to the query, based on a quantifiable metric, such as a key-word hit. These dialog systems may perform structured database queries, or unstructured database queries, however the results are represented in the same manner: as a list of items. Such current systems have several drawbacks. One critical drawback is that these systems often provide users with either no responses or too many responses. In both cases, the user effectively receives no meaningful information, since zero responses to a query or too many responses to a query can leave the user feeling confused or overwhelmed. Although these systems may provide some degree of user interaction to modify the query to obtain meaningful results, in many of these situations, users are required to recite specific phrasings, listen to lengthy prompts or otherwise conform their query to a format dictated by the system. This disadvantage of current dialog systems is especially critical when the users are preoccupied with other important tasks, such as driving a car or operating heavy machinery. For cognitively demanding situations such as driving in heavy traffic, it is very important to allow users to speak naturally and to allow flexibility in dialog flow. Because drivers are focusing on driving, and not on reading a graphical display, it is essential for the system content to be delivered in a way that does not overwhelm them or distract them from the task of driving.

An additional disadvantage of typical present dialog systems is that they rely on static rules, data structures and/or data content to process and return responses to user queries. These systems are often limited to a particular use or application, and cannot be easily customized differently for each application or service. Furthermore, such systems often do not dynamically account for, or modify, the processing method in response to user preferences, historical data, and other salient factors relevant in the query process.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a configurable content optimizer for use in dialog systems are described. In one embodiment, the content optimizer is a configurable component that acts as an intermediary between a dialog management module and a knowledge management module of a dialog system during the query process. The content optimizer module makes extensive use of the system ontology and organizes items returned by the knowledge base and makes adjustments to the query so that a reasonable number of responses are returned. Each query is broken down into a number of constraints, the constraints are characterized by type, and adjustments are made by strategies that include relaxing or tightening constraints in the query. Generic strategies for the potential adjustments are represented in a configurable manner so that the content optimizing module can be easily applied to new domains. In addition, the ontological knowledge is used to help organize the data and accumulate statistics that can be used by the dialog manager. Such a dialog system ameliorates much of the unnaturalness present in current spoken dialog systems, and thereby improves the usability of dialog systems.

In the following description, numerous specific details are introduced to provide a thorough understanding of, and enabling description for, embodiments of the content optimizer-based dialog system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In existing dialog systems, responses to user queries are usually triggered by dialog manager processes based on various events and their states. The content presented in the responses is usually pre-programmed, stored in a pre-defined way and retrieved directly from the databases. For systems with large databases, this poses potential problems in that the users can often either receive empty answers or too many possible answers. A dialog system according to an embodiment of the present invention includes a content optimizing module (referred to herein as a "content optimizer") that organizes and optimizes the content based on various rules including requests from users, their past preferences, and general ontological structures through configurable means. In general, a query that is input to the dialog system from a user can be a question that requires an answer, a request to perform a certain act, or a combination of a question and request. A database, also referred to as a "knowledge base," can be a data store, data cache, or any other type of structured data that is stored in a persistent storage device and that is accessed by the dialog system in response to the user query.

Figure 1:
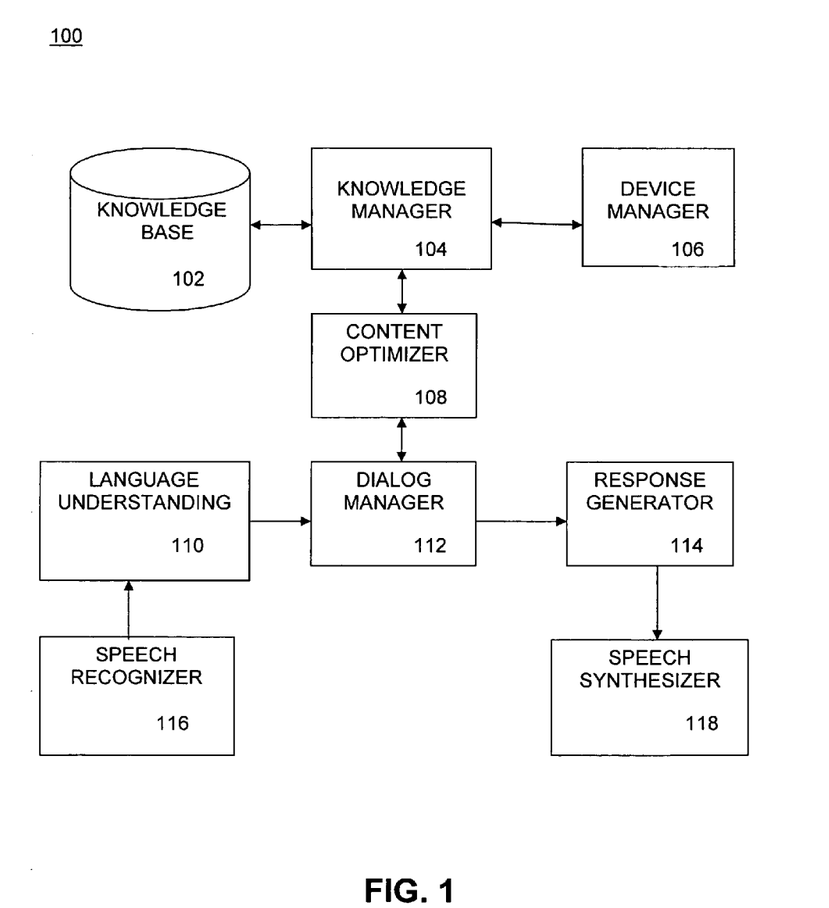
FIG. 1 is a block diagram of a dialog system including a content optimizer, according to an embodiment.

FIG. 1 is a block diagram of a dialog system including a content optimizer, according to an embodiment. System 100 illustrated in FIG. 1 generally provides end-to-end spoken language (or text-based) processing for interaction with multiple devices. These devices (not shown) can include many different types of computers, appliances, machinery, and other type of computer-controlled or automated apparatus. System 100 can be implemented in a distributed computing system comprising a number of computers or workstations coupled together over a network. Alternatively, the functional blocks of system 100 can be implemented in a single computer that represents a unitary dialog system.

As opposed to a hub architecture employed by many present dialog systems, system 100 uses an event-based, message-oriented middleware module. Event-based architectures provide for advantageous implementation of processes in distributed systems, such as allowing dynamic registration of new components.

For the embodiment illustrated in FIG. 1, the dialog system 100 includes several modules, such as a speech recognition module 116, a language understanding module 100, a dialog management module 112, a response generation module 114, a speech synthesis module 118, a knowledge management module 104, a knowledge base 102, and a device management module 106. System 100 illustrates a system that can be used in both a speech-based dialog system and a text-based (e.g., computer input) dialog system. It should be noted that the speech recognition module 116 and the speech synthesizer module 118 are necessary only in spoken dialog systems. A text or graphics-based dialog system may instead have one or more text input and output display modules in place of the speech recognition module 116 and speech synthesis module 118. Each management module of FIG. 1 may also be referred to simply as a "manager."

In an embodiment for speech-based systems, the speech recognition module 116 takes in acoustic signals comprising the user's spoken words and outputs a sequence or a lattice of words with additional labels, such as confidence scores. The language understanding module 110 takes the sequence or a lattice of words with attached confidence scores from the speech recognition module 116 and outputs a structured meaning representation, based on a statistical model trained on in-domain linguistic data and the available knowledge base 102. The dialog management module 112 takes the structured meaning representations from the language understanding module 110 and interprets them in context to issue appropriate instructions to the other modules based on the context and its knowledge base.

In one embodiment, the language understanding module 110 consists of four sub-modules: a statistical tagger, a statistical dependency parser, a feature mapper, and a topic classifier. The statistical tagger uses Hidden Markov Models to describe probabilities in predicting part-of-speech tags based on history, and the Viterbi algorithm to find the best tag sequence. The feature mapper takes the dependency relations from the statistical dependency parser and produces an XML feature structure representation. Parallel to that process, the topic classifier classifies the spoken string (utterances) into the top n topics and sends these to the dialog manager 112 in the case that the dialog manager cannot make sense out of the parses found. The language understanding module 110 also supports dynamic updates of the knowledge base 102 to allow the knowledge base to be updated at runtime. For example, if the dialog system is used in a musical application, such as an MP3 player, for the MP3 domain, the data comprising the knowledge base may not contain any specific song names, but rather a generic 'songname' class. This allows the song database to be updated, extended, or replaced at runtime.

In one embodiment, domain knowledge is structured according to domain-dependent ontologies. In general, an ontology is a hierarchical category of items that exist in a domain of interest from the perspective of a user. It can refer to a hierarchy of items or item types, or a framework of distinctions from which a hierarchy can be generated. A domain refers to a general application, area, or machine for which the user is placing a query. The knowledge management module 104 serves as a gateway to one or more knowledge bases 102, and manages the general ontology, the domain-specific ontology, the device information, and the database for any active domain. It also updates and synchronizes the current knowledge base 102 among different modules.

The dialog management module 112 uses a dialog-move approach to maintain dialog context, which is then used to interpret incoming utterances (including fragments and revisions), resolve noun phrases, construct salient responses, track issues, etc. A dialog state can also be used to bias speech recognition expectations and improve speech recognition performance. In a typical interaction, the dialog manager 112 converts a user's query into a semantic frame (i.e. a set of semantic constraints) and sends this to the knowledge manager 104. For example, in the MP3 domain, a command to "play some rock music by U2" results in a query for objects of category song with genre=rock and artist=U2, where genre and rock are (inherited) properties of the song class. The knowledge base 102 can be dynamically updated with new instances at any point.

The device manager 106 encapsulates the application-specific information and formats from the rest of the dialog system for transmission or control of one or more coupled devices. It also synchronizes the application states with the knowledge manager 104. The response generator 114, also referred to as a "language generation module" takes the content from the dialog manager 112 and organizes it in a succinct and grammatical way for speech synthesizer (text-to-speech module) 118. The speech synthesizer 118 takes the word sequences with tagged features and produces speech waveforms for output through speakers or similar sound generation devices.

For the embodiment illustrated in FIG. 1, the dialog manager 112 transmits the semantic frame embodying the user's query to the knowledge manager 104 through a content optimizer module 108. The content optimizer 108 acts as an intermediary between the dialog manager 112 and the knowledge manager 104 during the query process. It receives semantic frames from the dialog manager 112, resolves possible ambiguities, merges revision frames for a query with the initial query, and queries the knowledge manager 104.

Depending on the items in the query result set, any configurable properties defined for the system, and any user preferences provided by a user model, the content optimizer 108 selects and performs an appropriate optimization strategy on the query.

For system 100, several additional processing blocks may also be included to enhance the processing of text or speech input and output. For example, for speech-based systems, a prosody detection module (not shown) may be included in the speech recognition stage of system 100 to correct for variations in intonation, timing, and loudness of the speech input. Similarly, for text-based dialog systems, spelling and grammar check modules (not shown) may be included to facilitate ease of text entry.

Figure 2:
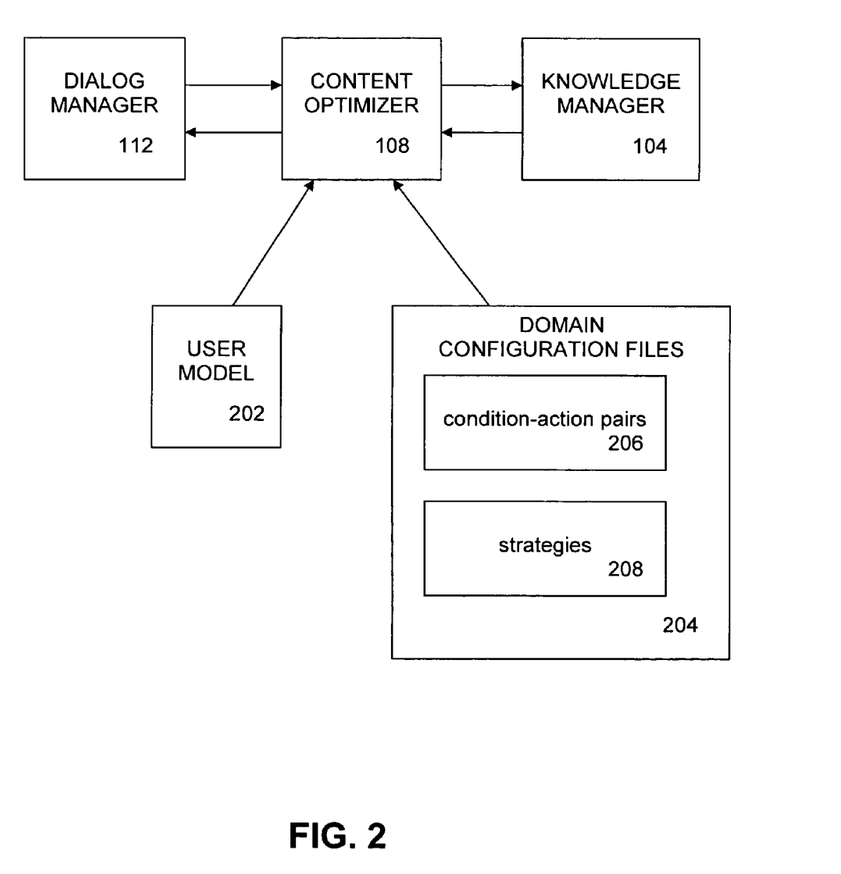
FIG. 2 is a block diagram illustrating functional components of a content optimizer according to an embodiment.

FIG. 2 is a block diagram illustrating functional components of a content optimizer according to an embodiment. As illustrated in FIGS. 1 and 2, the content optimizer 108 interfaces between dialog manager 112 and knowledge manager 104. The content optimizer 108 receives queries from the dialog manager 112 and passes them on to the knowledge manager 104 after performing certain organization and refinement steps on the query. A query typically consists of one or more constraints that define elements that allow the system return results from the knowledge base. In general, the content optimizer refines or modifies a query if the initial query results in the return of too few or too many responses. In one embodiment the content optimizer invokes one or more strategies to modify one or more of the constraints to allow the system to return a meaningful result or set of results. The content optimizer contains or accesses a library of domain-independent strategies and makes use of internal or external configuration files to specify the conditions under which a particular strategy ought to be used.

For the embodiment shown in FIG. 2, the content optimizer 108 takes user preference data from a user model 202 to refine an initial or modified query based on characteristics unique to the user or a group of users. The user preference data may be stored as a database or data structure in a data store that is tightly or loosely coupled to the content optimizer module. The user preference data includes data pertaining to the user that is pre-defined and/or data that is evolved through use of the system.

As further shown in FIG. 2, the content optimizer 108 also contains or has access to domain configuration files 204 (also referred to herein as "configuration files 204", or "configuration files"). The domain configuration files represent one or more sets of configurable properties that can be customized differently for each domain (i.e., application or service). In general, different applications may require different strategies under different conditions. Thus, the configuration files 204 are readily updateable to facilitate the applicability of the content optimizer module 108. As shown in FIG. 2, the domain configuration files 204 are external to the content optimizer. This enhances portability of the content optimizer module 108 within the dialog system 100, and facilitates ease of modification of the configuration files. By this mechanism, the work required to add a new domain is minimal, typically requiring only the definition or addition of a new configuration file and a domain ontology. In an alternative embodiment, the domain configuration files 204 can be maintained as internal files within the content optimizer 108.

The main functional tasks of the content organizer 108 include keeping track of the constraints specified in the query and making modifications to the query, as necessary; organizing and summarizing the items returned from knowledge manager based on domain ontology or other knowledge specified in the user model 202; and proposing possible adjustments or refinements to the query based on the returned items, information in the domain model, and domain-independent modification strategies. To achieve this functionality, the domain configuration files 204 include various modification strategies 208 and their associated conditions for applicability 206. The condition-action pairs 206 specify conditions, such as the size of the query result set, and the associated actions that need to be taken. The strategy file 208 includes a set of strategies that the optimizer will automatically implement to modify the constraints within the query for further processing by the knowledge manager. The strategy file 208 can also include a set of strategies to propose to the user when there are too few or too many qualified items, or if the user indicates that the returned responses were not appropriate.

When received by the content optimizer 108, each query is broken down into one or more constraints that comprise the query. As an example of a query, such as may be used in an automobile navigation system, a user may request the system to find a cheap Japanese restaurant in Palo Alto. Each constraint represents a key characteristic of the object or action that the user is inquiring about. Thus, in this example, the constraints include a type of object—restaurant, a cuisine—Japanese, a price range—cheap, and a location—Palo Alto. The initial query may return too few or too many results back to the user, depending upon various factors such as the formulation of the query, the knowledge base in the system, and the rules that govern fetching the data in response to the query. The content optimizer 108 applies one or more strategies 208 stored in the configuration file 204 to the constraints to return an optimum number of results to the user. The strategies applied by the content optimizer can include relaxing a constraint, adding a constraint, removing a constraint, or tightening a constraint. In general, if too few results were returned for an initial query, one or more constraints would be relaxed or removed, and if too many results were returned for an initial query, one or more constraints would be tightened or added. The selection of which constraint to modify and which modification to perform (if any) is determined by a combination of factors including the number of items in the result set, the system ontology, prosodic information, information from the user model, and other information, such as environmental conditions.

In one embodiment, the constraints comprising the query can be separated into types according different characteristics. For example, the constraint types can include: string, binary, scalar, or hierarchical types. The constraint type determines how many values and what type of values can be attributed to the constraint. String-type constraints comprise alphanumeric text strings, binary-type constraints take a yes/no value, scalar-type constraints take a range of values that are ranked (e.g., 1-10, A-F, etc.), and ontology-type constraints (hierarchical constraints) set forth a hierarchy of classes ranging from superclass to class to subclass. The constraint type dictates how the query modifying strategy acts on the constraint. For example, scalar-type constraints are modified differently from binary or ontology-type constraints for a give strategy, e.g., relaxation.

Figure 3A:
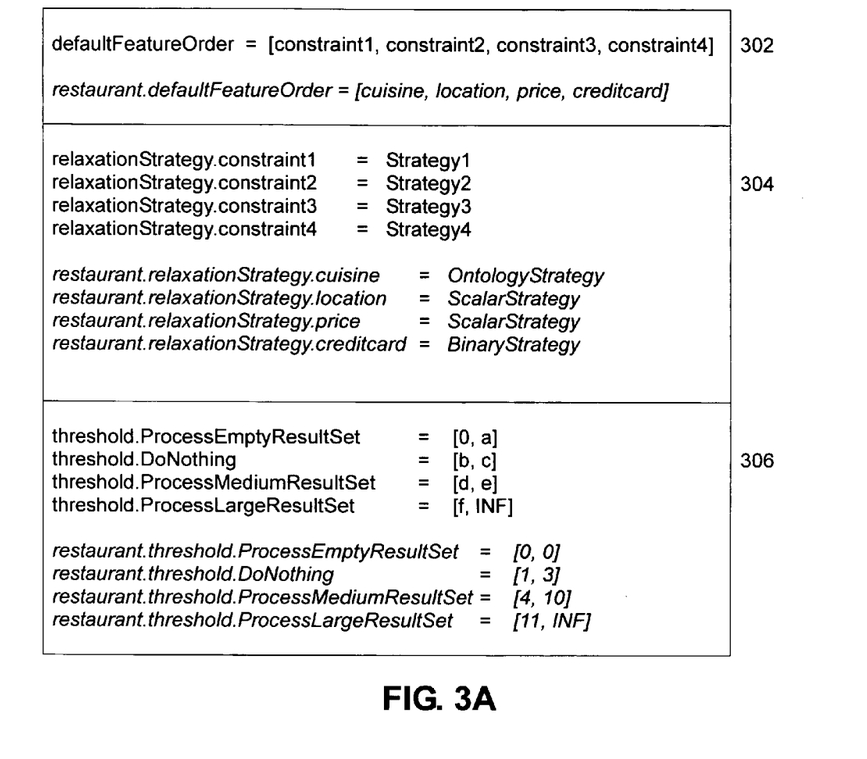
FIG. 3A is an example of a configuration file according to an embodiment.

FIG. 3A is an example of a configuration file according to an embodiment. As shown in FIG. 3A, the configuration file has three blocks of properties. The first block 302 specifies the default feature (constraint) order that selects the constraints to modify, and the order in which they are modified, denoted in FIG. 3A as constraints 1-4. The second block of properties 304 associates the domain constraints defined in block 302 with the appropriate domain-independent strategies, denoted in FIG. 3A as strategies 1-4. The name of the strategy string, here "relaxationStrategy" defines the type of strategy to be employed and the actual assigned strategy, strategy n specifies that type of strategy applied to a particular constraint. Constraint relaxation is one type of modification strategy the content optimizer can perform, however other strategies may also be available. Thus, additional entries in block 304 might read "tightenStrategy.constraintn," "deleteStrategy.constraintn," "addStrategy.constraintn," and so forth. The third block of properties 306 in FIG. 3A associates content optimizer processes with the appropriate size ranges of the result set, as will be described in further detail below with respect to FIG. 3B.

For purposes of illustration, each block in FIG. 3A includes example configuration file elements for a particular example of a restaurant query. The entries for the restaurant selection application are shown in italics. For the example restaurant application, the constraints, in order of possible modification are: cuisine, location, price, and credit card acceptance policy, as shown in block 302. As shown in block 304, each constraint has a relaxation strategy associated with it, depending upon its type. The cuisine constraint is a hierarchical-type constraint, thus the relaxation strategy is an ontology strategy. Both the location and price constraints are scalar-type constraints, thus their relaxation strategy is a scalar strategy. The credit card acceptance policy is a binary value (e.g., either yes or no), thus the relaxation strategy is a binary strategy. With regard to the size ranges of the result set specified in block 306, the restaurant application example assigns specific ranges for the four possible actions. For the example of FIG. 3A, if the result set is within the range of one to three responses, the content optimizer will not invoke a modification strategy and the dialog manager will simply list the items in the result set. However, if there are no returned responses or greater than five returned responses, the content optimizer will invoke a strategy that involves modifying the constraints in the order specified in block 302 and using the strategies specified in block 304.

Figure 3B:
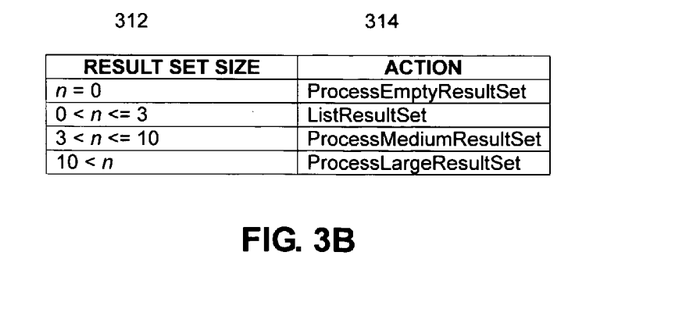
FIG. 3B is a table that specifies actions based on the size of the result set, according to an embodiment.

FIG. 3B is a table that specifies actions depending upon the size of the result set, according to an embodiment. For purposes of illustration, the result set sizes in FIG. 3B, correspond to the range sizes illustrated in block 306 of FIG. 3A. As shown in column 312 of FIG. 3B, a number n of results is returned for a query. For the example shown, depending upon the value of n, different actions may be taken by the content optimizer, as shown in column 314.

If there are no returned results (n=0), the ProcessEmptyResultSet action causes the content optimizer to state there are no matches, and then perform the appropriate modification or modifications for an empty set. This action causes the content optimizer to determine which constraint to modify, perform the modification, re-query the knowledge manager, and send the modified result set (along with the original result set) to the dialog manager. Alternatively, the system may elicit a constraint to relax from the user.

If there are one to three returned results (0<n<=3), the ListResultSet action causes the content optimizer to state number of matches and then list the items in the result set. This range of returned results may be defined as an optimal response, and therefore no further modification or action needs to be taken by the content optimizer.

If there are four to ten returned results (3<n<=10), the ProcessMediumResultSet action causes the content optimizer to state the number of matches, perform the appropriate modification or modifications for a too numerous result set by determining which constraint to modify, perform the modification, re-query the knowledge manager, and send the modified result set (along with the original result set) to the dialog manager. Alternatively, the system may elicit further constraint modification from the user.

If there are greater than ten returned results (10<n), the ProcessLargeResultSet action causes the content optimizer to state approximate number of matches, perform the appropriate modification or modifications for a too numerous result set by determining which constraint to modify, perform the modification, re-query the knowledge manager, and send the modified result set (along with the original result set) to the dialog manager, or alternatively elicit further constraint modification from the user.

Figure 4:
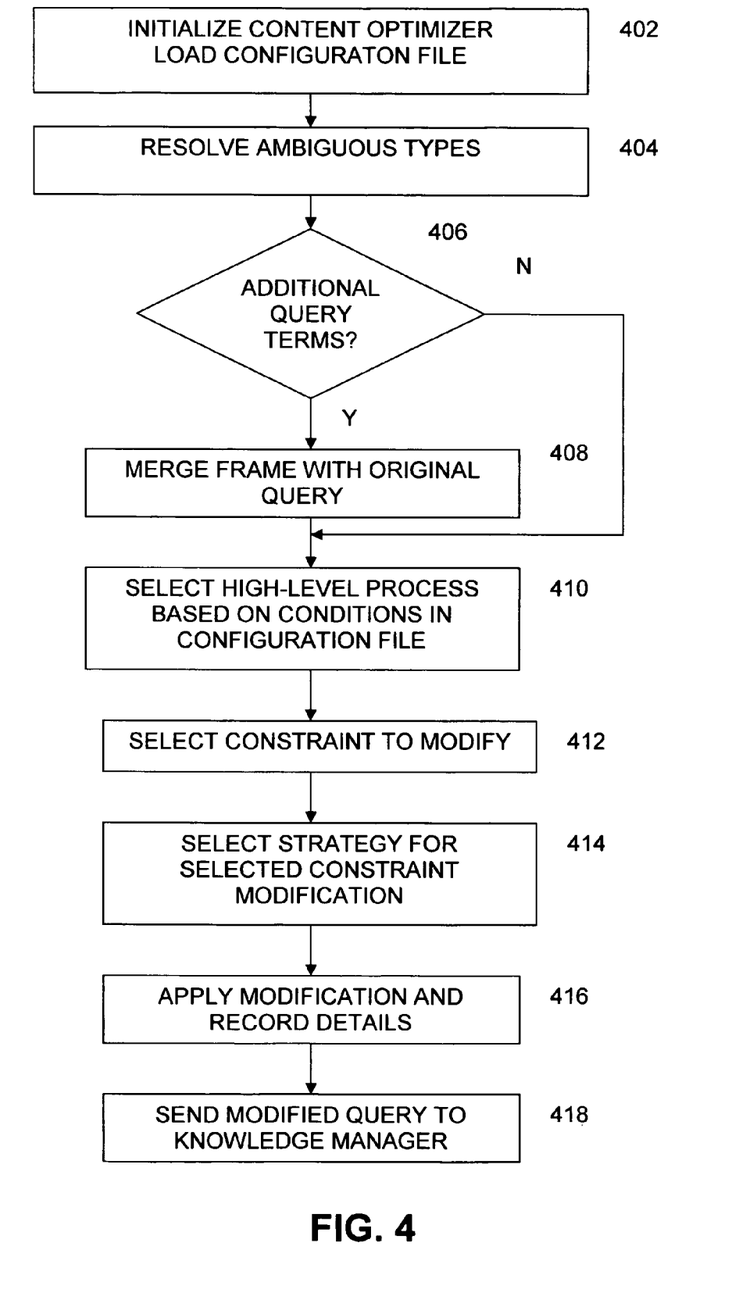
FIG. 4 is a flowchart that illustrates a method of processing a query in a dialog system, according to an embodiment.

As illustrated in FIG. 2, the data links between the content optimizer 108 and the dialog manager 112 and knowledge manager 104 are bi-directional. In terms of overall flow, a query is passed from the dialog manager 112 to the content optimizer 108 and then to the knowledge manager 104. After access to the knowledge base, the query result is passed from the knowledge manager 104 through the content optimizer 108 and back to the dialog manager 112. FIG. 4 is a flowchart that illustrates a method of processing a query in a content optimizer-based dialog system, according to an embodiment. At startup, the content optimizer is initialized in 402. The initialization process typically includes loading the configuration files 204, any user models or preference files 202, and any other files or utilities required for operation. Upon receiving the query, the content optimizer first resolves any ambiguous types or terms, 404. An example of an ambiguous term would be a request to find "something by the cars", where the term cars could refer to the musical band or a type of object. In 406, the system determines whether the query or utterance received is an additional term or terms for an initial query. This determination is handled by the dialog manager 112. If the query contains additional terms, the frames containing the additional term or terms are merged with the original query, 408. In this process, the content optimizer 108 determines how to merge the new constraints with the old constraints. This sequence 402-406 represents the process of transmitting a query from the dialog manager to the knowledge manager through the content optimizer. The method of FIG. 4 continues with a sequence starting at 410 that represents the processing of query results back to the dialog manager from the knowledge manager through the content optimizer. In 410, the content optimizer selects a high level process based on conditions in the configuration file. It also takes the initial threshold for the result number set. If too few or too many results are returned, the content optimizer will perform a modification to one or more constraints in the initial or modified query, such as those illustrated in FIG. 3B. In 412, the content optimizer selects which constraint to modify and the selects the appropriate strategy for the selected constraint modification, 414. The content optimizer then applies the modification to the query and records the details of the modification, 416. It then sends the modified query back to the knowledge manager for the generation of a response, 418. The process illustrated in FIG. 4 may include one or more time-out mechanisms that interrupt, re-direct, or re-start the process flow (such as from initialization 402) in the event of a delay, exception condition, or similar trigger event during execution of the process.

In one embodiment, the strategies that can be invoked by the content optimizer include relaxing or removing a constraint (e.g., if too few results are returned) or adding or tightening a constraint (e.g., if too many results are returned). Each strategy can be applied to each different type of constraint (e.g., ontology, scalar, and binary). Therefore, as shown in FIG. 4, the content optimizer first selects the constraint to modify based on the specifications provided in the configuration file and then selects the strategy for the constraint. Thus, each of the type of constraints that might be present in the query, ontology, scalar, and binary can be relaxed, removed, tightened, or added. FIG. 3A lists some examples of commands that may contained in the configuration file for relaxation strategies for the different possible types of constraints, i.e., binary, scalar, and ontology. In one embodiment, the content optimizer is a scalable module that can accommodate different or additional relaxation strategies for various types of constraints besides just binary, scalar and ontology constraints, including combinations of different relaxation strategies. As new relaxation strategies are developed they can be added to the content optimizer for implementation in the dialog system according to embodiments.

In one embodiment, the strategy of tightening or adding a constraint entails eliciting further input from the user regarding specifying a subgroup within the group of all results obtained, and the strategy of relaxing or removing a constraint entails automatically relaxing or removing a constraint specified by the configuration file, or removing or relaxing the constraint that yields the smallest result set greater than zero. For binary constraints, the process of relaxing the constraint entails accepting either state as an acceptable state. For scalar constraints, the process of relaxing the constraint entails broadening the possible range of values for that constraint. For example, if a restaurant query for 5-star rated restaurants returned no results, the content optimizer could relax this constraint to return results for 3 or 4-star restaurants that might be listed in the knowledge base.

Figure 5:
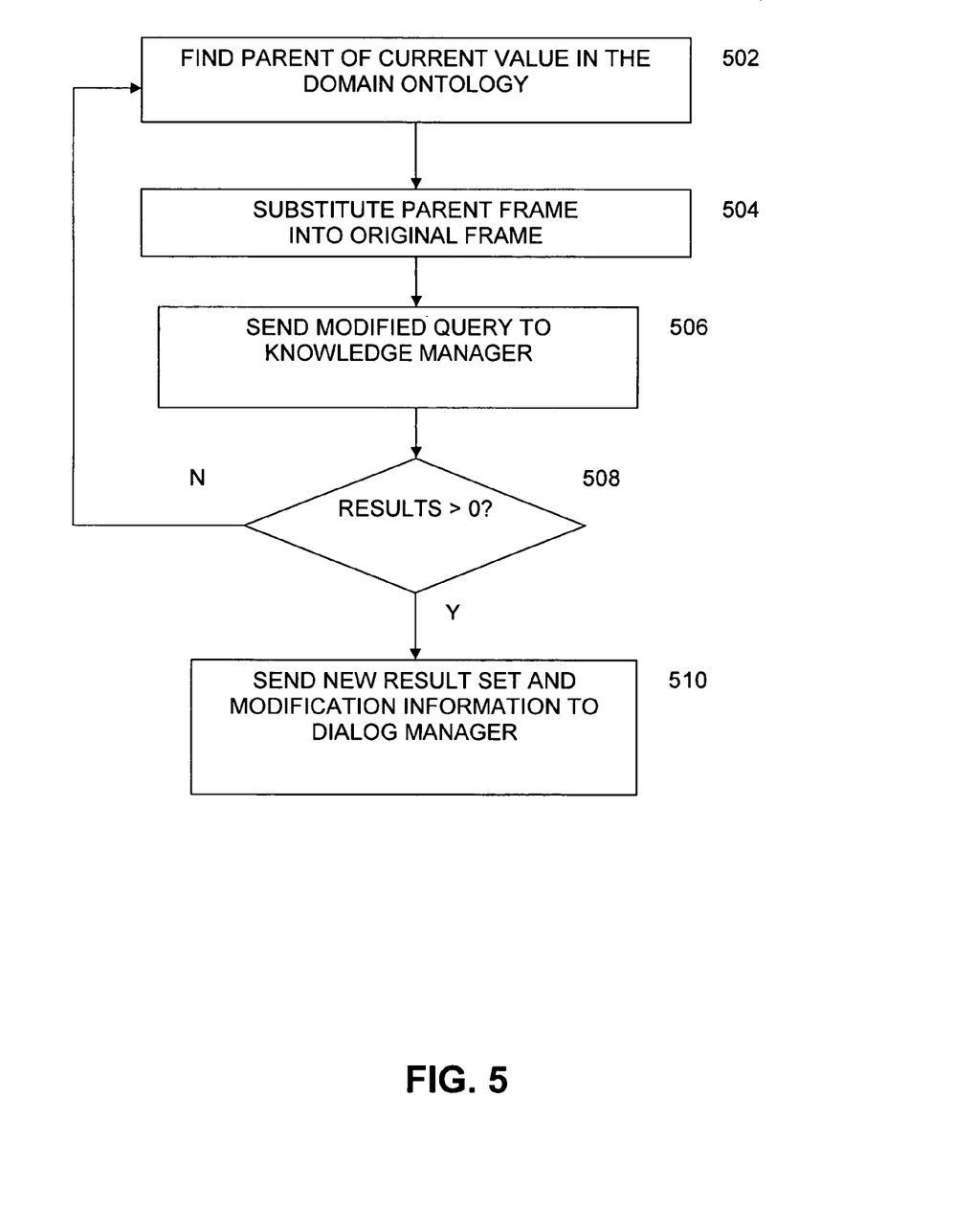
FIG. 5 is flowchart that illustrates a relaxation strategy for an ontology constraint; according to an embodiment.
Figure 6A:
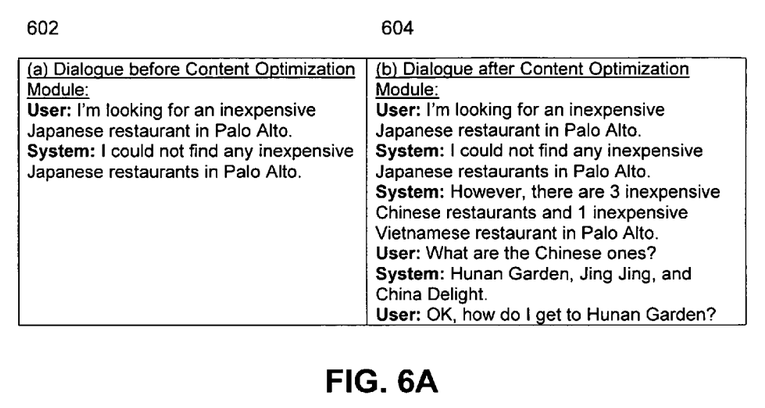
FIG. 6A is a table that illustrates an example of a query that is processed by a content optimizer-based dialog system, according to an embodiment.
Figure 6B:
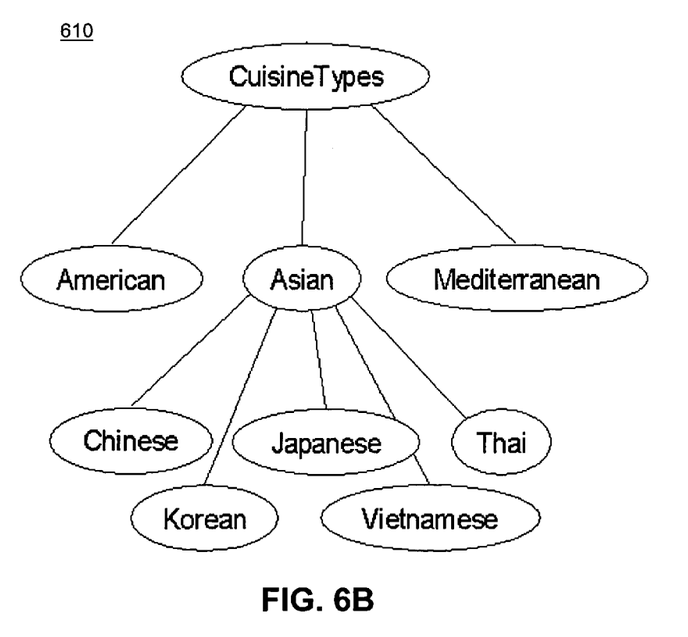
FIG. 6B illustrates a portion of a hierarchical ontology for the example of FIG. 6A.
Figure 6C:
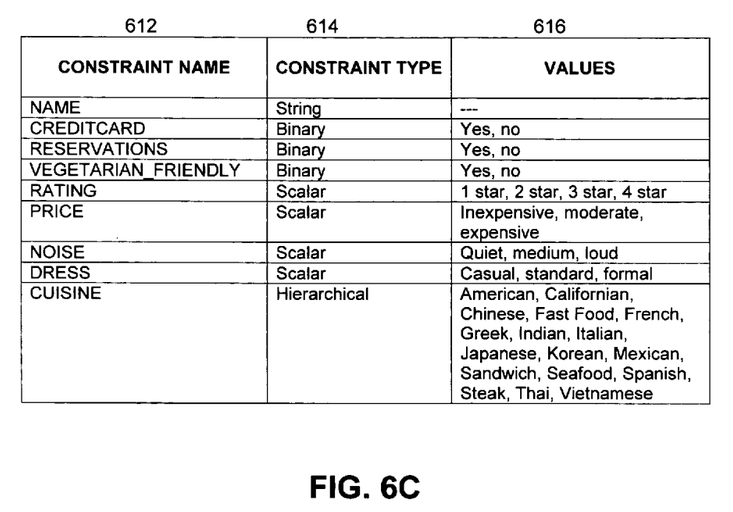
FIG. 6C is a table that lists an example of various constraints with corresponding types and values for the example of FIG. 6A.

In one embodiment, a primary strategy involves relaxing the domain ontology constraint to widen the range of possible responses to a query. FIGS. 6A-6C illustrate an example of a query session in which the content optimizer relaxes an ontology domain to return results to the user. For the example of FIGS. 6A-6C, which will be described in greater detail below, the content optimizer relaxes an ontology-based constraint (cuisine) to respond to a search for a particular restaurant FIG. 5 is flowchart that illustrates a relaxation strategy for an ontology, according to an embodiment. In 502, the parent value of the current value in the domain ontology is found. For the example provided in FIGS. 6A and 6B, the parent value of the cuisine type domain is 'Asian'. In 504, the parent value is substituted into the original frame to produce a modified query. This modified query is then sent to the knowledge manager, 506. In 508 it is determined whether or not the number of results for the modified query is greater than zero. If yes, the system sends the new result set and modification information to the dialog manager 510. If the number of results is not greater than zero, the process repeats from 502, wherein the parent of the current value in the domain is found and then substituted into the prior frame. FIG. 5 illustrates one example of an ontology relaxation strategy according to embodiments. Other ontology relaxation strategies can be implemented as well, such as picking a preferred sibling node and other similar strategies. In one embodiment, the parent value represents a broader domain or concept of the current domain or current value.

FIG. 6A is a table that illustrates an example of a query that is processed by a content optimizer, according to an embodiment. FIG. 6A illustrates an instance of the content optimizer relaxing an ontology constraint. Column 602 provides an example of a query processed in a dialog system without content optimization, and column 604 provides an example of the same query processed with content optimization, according to an embodiment. As shown in FIGS. 6A-6C, without content optimization, the dialog system can easily provide zero responsive replies to the query. When the user's query returns no results, the system simply reports that there are no results, which leaves the user unsure as to how to proceed. Just as easily, such a system may provide too many responses. In either case, the result is unsatisfactory and further interaction with the user is necessary to obtain an appropriate answer. The content optimizer, according to embodiments, is based on a domain ontology and organizes the items in a query result in such a way that the dialog manager can present the content in a helpful manner, such as that shown in column 604. In general, the content optimized system conveys the same information as the non-content optimized system, but in addition, it suggests reasonable alternatives. For the example of FIG. 6A, no Japanese restaurants in Palo Alto were found so the original constraint of cuisine =Japanese was relaxed to cuisine =Asian, which resulted in four possible choices of alternative Asian restaurants.

The manner in which a constraint ought to be relaxed depends on what kind of values it takes. For example, for the CUISINE constraint, values are related hierarchically (e.g., Chinese, Vietnamese, and Japanese are all subtypes of Asian). FIG. 6B illustrates a partial hierarchical ontology for the example shown in FIG. 6A, according to an embodiment. Ontology 610 illustrates various subtypes and sub-subtypes for the domain of cuisine types. For the example of FIG. 6A, as shown in column 604 the constraint that gets relaxed is CUISINE, so the associated strategy may be restaurant.relaxationStrategy.cuisine=OntologyStrategy, as shown in FIG. 3A.

Although the cuisine constraint was selected by the default feature order command as the first constraint to be relaxed, other constraints could have been relaxed instead. For example, with reference to FIG. 6A, the price constraint could have been relaxed in which case the system might have returned the response that a Japanese restaurant of a greater price range is available in Palo Alto, or the location constraint could have been relaxed so that the system might return a response that a cheap Japanese restaurant is available in neighboring city, such as San Jose.

In one embodiment, the content optimizer may implement specific negotiation strategies based on ontological information. In this manner, the content optimizer may present a series of options to the user to allow the user to relax or specify other strategies for more than one constraint. Such strategies are useful for more complicated domains In one embodiment, the dialog system maintains a data structure in the configuration file that lists the constraints for a particular domain or application and various characteristics associated with the constraints. FIG. 6C is a table that lists an example of various constraints with corresponding types and values for the restaurant example of FIG. 6A, according to an embodiment. Using the example of a restaurant search, the table of FIG. 6C lists nine different constraints in column 612, the constraint type for each constraint in column 614, and the possible constraint values for each constraint in column 616. For the example illustrated in FIG. 6C, the constraint types include: string, binary, scalar, or hierarchical types. The PRICE values are scalar (e.g., cheap, moderate, expensive), and CREDITCARD values are binary (e.g., accepted or not accepted). The configuration files associate each feature with a particular strategy set in the content optimization module core.

In one embodiment, the content optimizer includes a facility for organizing large returned result sets. It provides the dialog manager with statistics about the distribution of items in the query result with respect to the concepts in the ontology. Statistics are calculated for superclasses as well as subclasses. Based on ontological structures, the content optimizer calculates descriptive statistics for every set of items returned by the knowledge manager in response to a user's query. In cases where there are too many items in a result set, these figures can be used by the dialog manager to give meaningful responses to enable the user to further refine the query. For example, in music search, the dialog manager may return the response: "There are 85 songs. Do you want to list them by a genre such as Rock, Pop, Soul, or Jazz?"

The content optimizer according to embodiments described herein provides several advantages over present dialog systems. The adjustment of constraints from users is unique, as is the provision of a variety of refinement strategies in a configurable way so that they can be easily updated or switched. This greatly facilitates any tuning of the dialog system for a particular application as well as porting to a new domain. In addition, the system provides a summary of returned results to be used by the dialog manager so that the dialog manager can provide a high level overview to the user without providing too much information or unnecessary details.

Embodiments of a dialog system incorporating an content optimizer as described herein can be used in various different applications, industries or industry segments, such as automobiles, airplanes, hand-held devices, cell-phones, and the like. The dialog system can be speech-based with user input and system output provided as spoken language, or it can be text-based with alphanumeric text input and output through a computing device or similar interface device.

Aspects of the configurable content optimizer described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the content optimizer include: microcontrollers with memory (such as EEPROM), embedded microprocessors, firmware, software, etc. Furthermore, aspects of the content optimizer program may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, and non-volatile storage media in various forms (e.g., optical, magnetic or semiconductor storage media) that may be used to transfer such formatted data and/or instructions through wireless, optical, or wired signaling media or any combination thereof. Examples of transfers of such formatted data and/or instructions include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the configurable content optimizer is not intended to be exhaustive or to limit the embodiments to the precise form or instructions disclosed. While specific embodiments of, and examples for, content optimization in dialog systems are described herein for illustrative purposes, various equivalent modifications are possible within the scope of the content optimizer, as those skilled in the relevant art will recognize.

The elements and acts of the various embodiments described above can be combined to provide further embodiments. These and other changes can be made to the content optimizer in light of the above detailed description.

In general, in the following claims, the terms used should not be construed to limit the content optimizer to the specific embodiments disclosed in the specification and the claims, but should be construed to include all operations or processes that operate under the claims. Accordingly, the content optimizer is not limited by the disclosure, but instead the scope of the recited method is to be determined entirely by the claims.

While certain aspects of the content optimizer are presented below in certain claim forms, the inventor contemplates the various aspects of the methodology in any number of claim forms. For example, while only one aspect of the content optimizer is recited as embodied in machine-readable medium, other aspects may likewise be embodied in machine-readable medium. Accordingly, the inventor reserves the right to add additional claims after filing the application to pursue such additional claim forms for other aspects of the configurable content optimizer.

What is claimed is:

1. A physical, non-volatile machine-readable medium including instructions which when executed in a processing system process a query input by a user to a dialog system by:
defining a default order of processing constraints identified in a query, each constraint representing a characteristic of an object or action in the query;
categorizing each constraint by constraint type, wherein the constraint type is selected from the group consisting of: string, binary, scalar, and ontology constraint types, and wherein each constraint type dictates how a corresponding constraint is modified by a modification strategy;
defining an optimum value range specifying an optimum number of results returned in response to the query;
applying a selected modification strategy to one or more constraints in accordance with the default order to generate a modified constraint if a number of results returned in response to the query is not within the optimum value range, the selected modification strategy comprising at least one of: relaxing a constraint, removing a constraint, tightening a constraint, and adding a constraint, wherein the selected modification strategy is selected based on factors comprising at least one of:

ontological information of the query and prosodic information of the query;

processing the query to obtain a number of results for the query;

processing a re-query based on the modified constraint to obtain a second number of results; and applying one of a different modification strategy to a same constraint or a second modification strategy to a subsequent constraint in the default order if the number of results for the re-query is not within the defined value range, wherein the step of tightening a constraint comprises:

accessing the ontological information, the ontological information comprising a plurality of domain types, each domain type comprising a plurality of subtypes, and a plurality of sub-subtypes arranged in a hierarchical structure, wherein a first constraint identified in the query is associated a first domain type;

determining that the first constraint corresponds to a specific subtype from the first domain type;

consulting information from a user model to determine whether the re-query should include a first specific sub-subtype or a second specific sub-subtype from the first domain type, the first and second specific sub-subtypes being at a level below the specific subtype; and determining that the re-query should include the first specific sub-subtype because the information from the user model comprises user data indicating a preference for the first specific sub-subtype.

2. The physical, non-volatile medium of claim 1, wherein the pre-defined range comprises one of zero number of data items and greater than a threshold number of data items, and wherein the value range comprises a plurality of subranges, wherein a first subrange causes a display of no results, a second subrange causes a display of an initial set of results for the query, a third subrange causes a modification of the one or more constraints based on the selected modification strategy, and a fourth subrange causes a modification of the constraints based on the selected strategy, and a prompt for further information input by the user.

3. The physical, non-volatile medium of claim 1, wherein the constraint type determines what number and type of values are attributed to each constraint of the one or more constraints, and wherein the string type constraint comprises an alphanumeric string, the binary type constraint comprises a yes/no value, the scalar type constraint comprises a ranked value, and the ontology type constraint comprises a hierarchy of classes.

4. The physical, non-volatile medium of claim 1 comprising:

determining that the re-query should not include the second specific sub-subtype because the information from the user model comprises user data indicating that the user does not prefer the second specific sub-subtype.

5. The physical, non-volatile medium of claim 1 wherein the step of adding a constraint comprises:

identifying first and second subtypes within a domain type;
consulting the information from the user model to determine whether the first subtype or the second subtype should be the added constraint; and determining that the first subtype should be the added constraint because the information from the user model comprises user data indicating a preference for the first subtype.

6. A method comprising:

receiving a first query from a first user;

defining a default order of processing constraints identified in the first query, each constraint representing a characteristic of an object or action in the first query;

categorizing each constraint by constraint type, wherein the constraint type is selected from the group consisting of: string, binary, scalar, and ontology constraint types, and wherein each constraint type dictates how a corresponding constraint is modified by a modification strategy;

defining an optimum value range specifying an optimum number of results returned in response to the first query;

applying a first selected modification strategy to one or more constraints in accordance with the default order to generate a modified constraint if a number of results returned in response to the first query is not within the optimum value range, the first selected modification strategy comprising at least one of: relaxing a constraint, removing a constraint, tightening a constraint, and adding a constraint, wherein the first selected modification strategy is selected based on factors comprising at least one of: the number of results for the first query, ontological information of the first query, prosodic information of the first query, and information from a first user model associated with the first user;

processing the first query to obtain a number of results for the query;

processing a first re-query based on the modified constraint to obtain a second number of results;

applying one of a different modification strategy to a same constraint or a second modification strategy to a subsequent constraint in the default order if the number of results for the first re-query is not within the defined value range;

receiving a second query from a second user, different from the first user;

consulting information from a second user model associated with the second user to select a third modification strategy to be applied to the second query, wherein the second query is the same as the first query, and the third selected modification strategy is different from the first selected modification strategy because the information from the second user model is different from the information from the first user model.

7. The method of claim 6 wherein the step of tightening a constraint comprises:

consulting the information from the first user model to automatically tighten the constraint.

8. The method of claim 6 wherein the ontological information comprises a hierarchical structure comprising a domain type, a plurality of subtypes, and a plurality of sub-subtypes, wherein the plurality of subtypes are at a level below the domain type, and the plurality of sub-subtypes are at a level below the plurality of subtypes.

9. The method of claim 6 comprising:

updating the information from the first user model based on input from the first user.

* * * * *